(12) United States Patent
Tomkins et al.

(10) Patent No.: US 11,429,495 B2
(45) Date of Patent: Aug. 30, 2022

(54) DATA RECOVERY MECHANISMS IN DEDUPLICATION-ENABLED STORAGE FACILITIES

(71) Applicant: International Business Machines Corporation, Armonk, NY (US)

(72) Inventors: Dominic Tomkins, Hook (GB); Eric John Bartlett, Chard (GB); Miles Mulholland, Eastleigh (GB); Alex Dicks, Winchester (GB)

(73) Assignee: International Business Machines Corporation, Armonk, NY (US)

(*) Notice: Subject to any disclaimer, the term of this patent is extended or adjusted under 35 U.S.C. 154(b) by 270 days.

(21) Appl. No.: 16/819,225

(22) Filed: Mar. 16, 2020

(65) Prior Publication Data

US 2021/0286687 A1    Sep. 16, 2021

(51) Int. Cl.
*G06F 11/14* (2006.01)
*G06F 16/215* (2019.01)

(52) U.S. Cl.
CPC ........ *G06F 11/1469* (2013.01); *G06F 16/215* (2019.01); *G06F 2201/82* (2013.01)

(58) Field of Classification Search
CPC .. G06F 11/14; G06F 11/1469; G06F 11/1453; G06F 11/1471; G06F 2201/82
See application file for complete search history.

(56) References Cited

U.S. PATENT DOCUMENTS

| | | | |
|---|---|---|---|
| 8,290,915 B2 | 10/2012 | Anglin | |
| 8,677,178 B2 | 3/2014 | Bartlett et al. | |
| 9,367,398 B1 | 6/2016 | Ben-Moshe et al. | |
| 9,886,349 B2* | 2/2018 | Beeken | G06F 3/0619 |
| 9,940,041 B2* | 4/2018 | Beeken | G06F 3/0689 |
| 10,037,154 B2 | 7/2018 | Provenzano et al. | |
| 10,042,714 B2* | 8/2018 | Beeken | G06F 3/0619 |
| 10,176,190 B2 | 1/2019 | Harijono et al. | |

(Continued)

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pages.

(Continued)

*Primary Examiner* — Kamini B Patel
(74) *Attorney, Agent, or Firm* — Alex Harvey

(57) ABSTRACT

A data recovery method recovers corrupted data after a disaster event in a storage facility operating with deduplication in which copies of data are maintained between volumes through a copy services relationship. The deduplication operates with referencing domains, each having a source grain containing a reference pointing to a location where data is stored and referrers pointing to the source. The data recovery method identifies any source that is pointing to data which is corrupt and then establishes whether a copy services relationship exists between the referencing domain of the source with corrupted data and another referencing domain, in which case the other referencing domain will have a copy of the corrupted data. Provided that the copy is valid, it is written across to replace the corrupted data. The method allows corrupted source data to be recovered without having to perform a full resync or restore.

16 Claims, 16 Drawing Sheets

(56) References Cited

U.S. PATENT DOCUMENTS

| | | | |
|---|---|---|---|
| 10,209,910 B2* | 2/2019 | Beeken | G06F 3/065 |
| 10,210,062 B2 | 2/2019 | Agombar et al. | |
| 10,255,137 B1 | 4/2019 | Panidis et al. | |
| 10,339,112 B1* | 7/2019 | Ranade | G06F 11/1453 |
| 10,817,209 B2* | 10/2020 | Matsushita | G06F 3/0608 |
| 2010/0070478 A1* | 3/2010 | Anglin | G06F 11/1464 |
| | | | 707/674 |
| 2014/0143786 A1* | 5/2014 | Ripberger | G06F 3/0605 |
| | | | 718/104 |
| 2016/0203055 A1* | 7/2016 | Dain | G06F 11/2082 |
| | | | 714/6.24 |
| 2017/0083250 A1* | 3/2017 | Beeken | G06F 3/0689 |
| 2017/0083404 A1* | 3/2017 | Beeken | G06F 11/1451 |
| 2018/0067815 A1* | 3/2018 | Beeken | G06F 3/065 |
| 2018/0165027 A1* | 6/2018 | Beeken | G06F 3/0689 |
| 2020/0097179 A1* | 3/2020 | Matsushita | G06F 3/0641 |
| 2020/0241753 A1* | 7/2020 | Gupta | G06F 11/1464 |
| 2021/0064247 A1* | 3/2021 | Tomkins | G06F 3/0673 |
| 2021/0173811 A1* | 6/2021 | Agrawal | G06F 11/1464 |
| 2021/0279141 A1* | 9/2021 | Vijayan | G06F 11/1469 |

OTHER PUBLICATIONS

Rostagni et al., "Data Validation During Data Recovery in a Log-Structured Array Storage System," U.S. Appl. No. 16/548,474, filed Aug. 22, 2019, 36 pages.

* cited by examiner

DATA RECOVERY MECHANISMS IN DEDUPLICATION-ENABLED STORAGE FACILITIES

BACKGROUND

Storage facilities may for example be based on a pool of multiple volumes or several pools grouped together in a storage system, or multiple such storage systems. Deduplication in a storage facility is the mechanism of storing references to source grains in metadata whenever a new write's IO data matches data already written by a grain, instead of carrying out the write conventionally which would result in the same data being stored again. A grain that contains a reference to a source is called a referrer. Generally, with deduplication, an arbitrary number of referrers from zero upward may point to a common source. A set of grains linked in this way is referred to herein as a "referencing domain."

After a disaster in a storage facility, a recovery mechanism will be applied to identify corrupted source data in the disaster domain and to restore as much of it as possible. The principal resources available for a recovery are a snapshot of the pool and a journal. A journal is a sequential log of IO operations carried out on the pool. The journal may be replayed from the time when the snapshot was taken to rebuild the system state closer to the time of the disaster. When source data is corrupted on a volume, a standard approach to recovery is to rewrite a full set of the volume's data from a copy, such as a mirror copy or a backup copy. The deduplication metadata references are lost and data recovery is restricted to what is in the backup or mirror copy.

SUMMARY

Some embodiments of the present disclosure can be illustrated as a method. The method may comprise identifying a first source in a data storage facility that, following a disaster event, is pointing to data which is corrupt. The method may further comprise determining that a first copy services relationship exists between a first referencing domain of the first source and a second referencing domain, where the first copy services relationship indicates the second referencing domain will have a second copy of the corrupted data. The method may further comprise determining whether the second copy is valid. The method may further comprise writing the second copy to replace the corrupted data in response to determining that the second copy is valid.

Some embodiments of the present disclosure can also be illustrated as a computer program product comprising a computer readable storage medium having program instructions embodied therewith, the program instructions executable by a computer to cause the computer to perform the method discussed above.

Some embodiments of the present disclosure can be illustrated as a system. The CPU may identify a first source in a data storage facility that, following a disaster event, is pointing to data which is corrupt. The CPU may further determine that a first copy services relationship exists between a first referencing domain of the first source and a second referencing domain, where the first copy services relationship indicates the second referencing domain will have a second copy of the corrupted data. The CPU may further determine whether the second copy is valid. The CPU may further write the second copy to replace the corrupted data in response to determining that the second copy is valid.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Features and advantages of various embodiments of the claimed subject matter will become apparent as the following Detailed Description proceeds, and upon reference to the drawings, in which like numerals indicate like parts, and in which:

Figure 1:
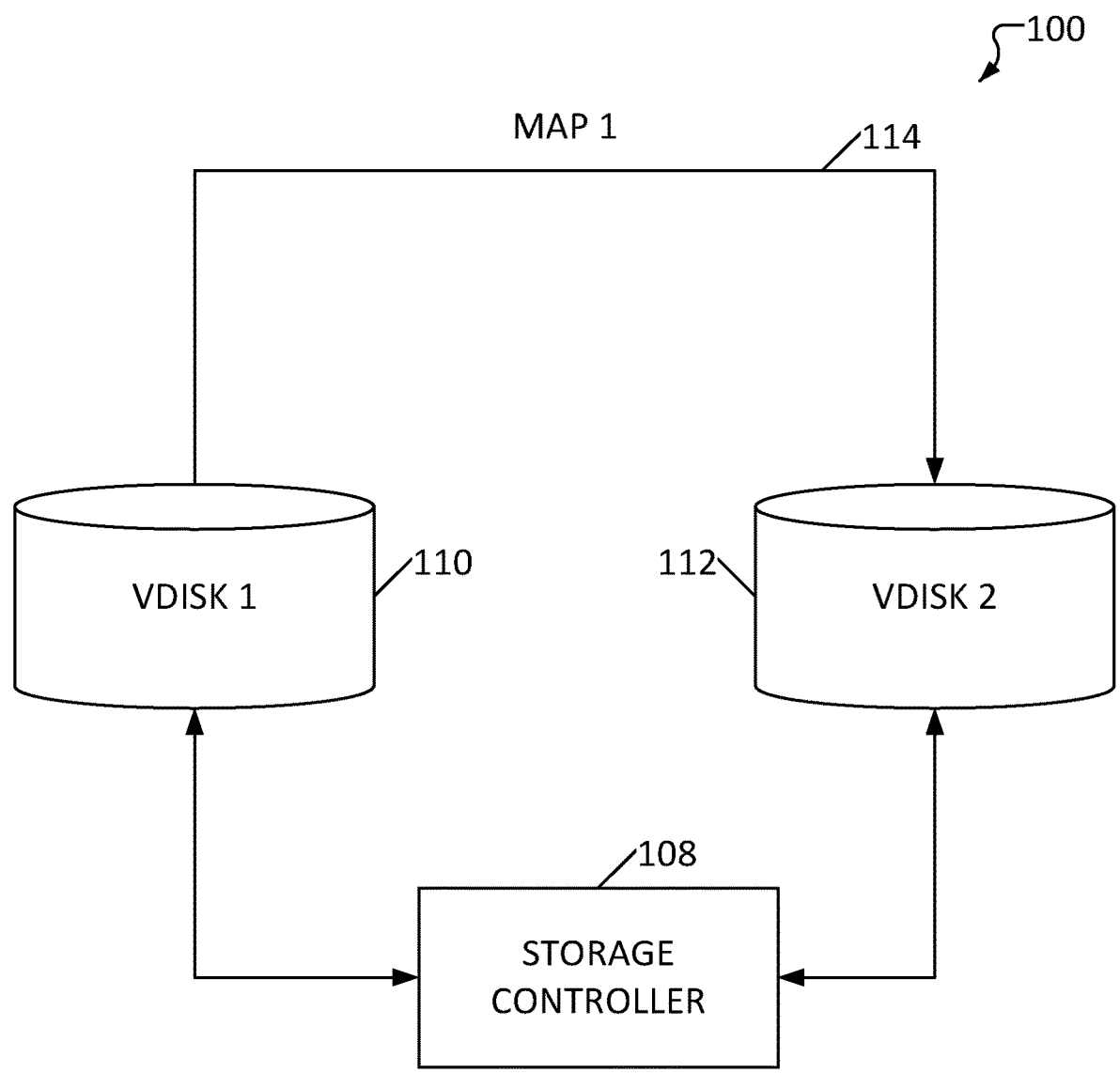
FIG. 1 depicts a generic backup process using a storage controller and two storage disks VDISK 1 and VDISK 2 according to several embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to data recovery mechanisms in storage facilities that operate with deduplication. More particular aspects of the present disclosure relate to methods and systems for performing recovery of corrupted data in deduplication-enabled storage volumes in which intact and valid references can be preserved, thereby avoiding the need for a full rewrite and loss of these still-valid references.

Throughout this disclosure, reference is made to the following terms. Their definitions are provided below.

A "source," as used herein, a source refers to metadata containing the location of written data and a count of the number of its referrers.

A "referrer," as used herein, refers to metadata containing a reference to source metadata for the data that has been written to that grain.

A "reference," as used herein, refers to an address in metadata.

"Metadata," as used herein, refers to data about the data written to a specific location, specifically in this disclosure in the context of the reference and the referrer count of each grain. The reference can either be the address of the location of the host data, in which case the grain metadata is a source. Or the reference can be to the source metadata which has previously written this host data, in which case the grain metadata is a referrer.

"Grain," as used herein, refers to a unit of address space that is the subject of IO operations, e.g. writes and reads. A grain is effectively the unit of granularity of the deduplication engine.

"Referencing domain," as used herein, refers to a set of grains that refer to a common source grain including the source grain and its referring grains.

A "(storage) volume," as used herein, refers to a singular logical block address (LBA) range presented either to a host or internally.

A "volume copy," as used herein, refers to a copy of a volume, e.g. a copy generated by mirroring, backup, or other copy service.

A "copy service," as used herein, refers to a service that maintains multiple copies of data across domains or systems.

A "(storage) pool," as used herein, refers to a grouping of volumes using the same backend or internal storage.

A "snapshot," as used herein, refers to a copy of a volume or other LBA range taken at a given point in time.

A "storage facility," as used herein as a generic term for a storage pool or single storage system or multiple storage systems.

A "storage system," as used herein, refers to a cluster for one or more storage pools.

In the following detailed description, for purposes of explanation and not limitation, specific details are set forth in order to provide a better understanding of the present disclosure. It will be apparent to one skilled in the art that the present disclosure may be practiced in other embodiments that depart from these specific details.

The recovery mechanisms described herein presuppose the existence of one or more copy services relationships that maintain copies of the same data at two or more different address ranges, e.g. in two different volumes or pools, such as may be provided by mirroring or by making backup copies.

Copy services allow storage facilities to have, amongst other things, disaster recovery integrated into the IO path. For example, IBM Spectrum Virtualize features multiple layers of copy services such as Volume Mirroring, Remote Copy and Flash Copy. Volume Mirroring and Remote Copy maintain ongoing copies of the source data, Flash Copy maintains snapshots of the source volume.

FIG. 1 depicts a system 100 including a storage controller 108 and two storage disks VDISK 1 (110) and VDISK 2 (112) according to several embodiments of the present disclosure. The disks 110 and 112 could form part of a larger array of disks and may form part of an enterprise storage solution. The disks 110 and 112 could be part of a storage solution relating to a commercial website, for example.

The storage controller 108 may be provided with a replication function for data backup. In some embodiments, the replication function may back up local data in a non-disruptive way to another set of local storage devices by using mirroring or point-in-time copies. In some embodiments, the replication function may backup the data to a remote site. Terminology in the art refers to a primary site and a secondary site for data storage, where the primary site is where the original or master copy is located and the secondary site is where the backup copy is located. Terminology in the art also refers to a source volume and a target volume, where data is transferred from the source to the target when performing a backup or mirroring operation. The term destination volume is a synonym for target volume. Example storage controllers with a replication function are the IBM SAN Volume Controller (SVC) or Storage RAID arrays such as the IBM Storwize (IBM trademark) products. Example mirroring or point-in-time copy technology is FlashCopy (IBM trademark) and Global Mirror with Change Volumes (GMCV). Example remote site data backup technology is HyperSwap (IBM trademark), Global Mirror (IBM trademark) or Metro Mirror (IBM trademark). Storage will typically be organized in virtualized storage arrays implemented with, for example the IBM SVC.

An example system running a copy service with an in-sync relationship may encounter a recovery event. The system may have several deduplication volumes in a referencing domain as well as a journal. The system may further support deduplication metadata and data.

Figure 2:
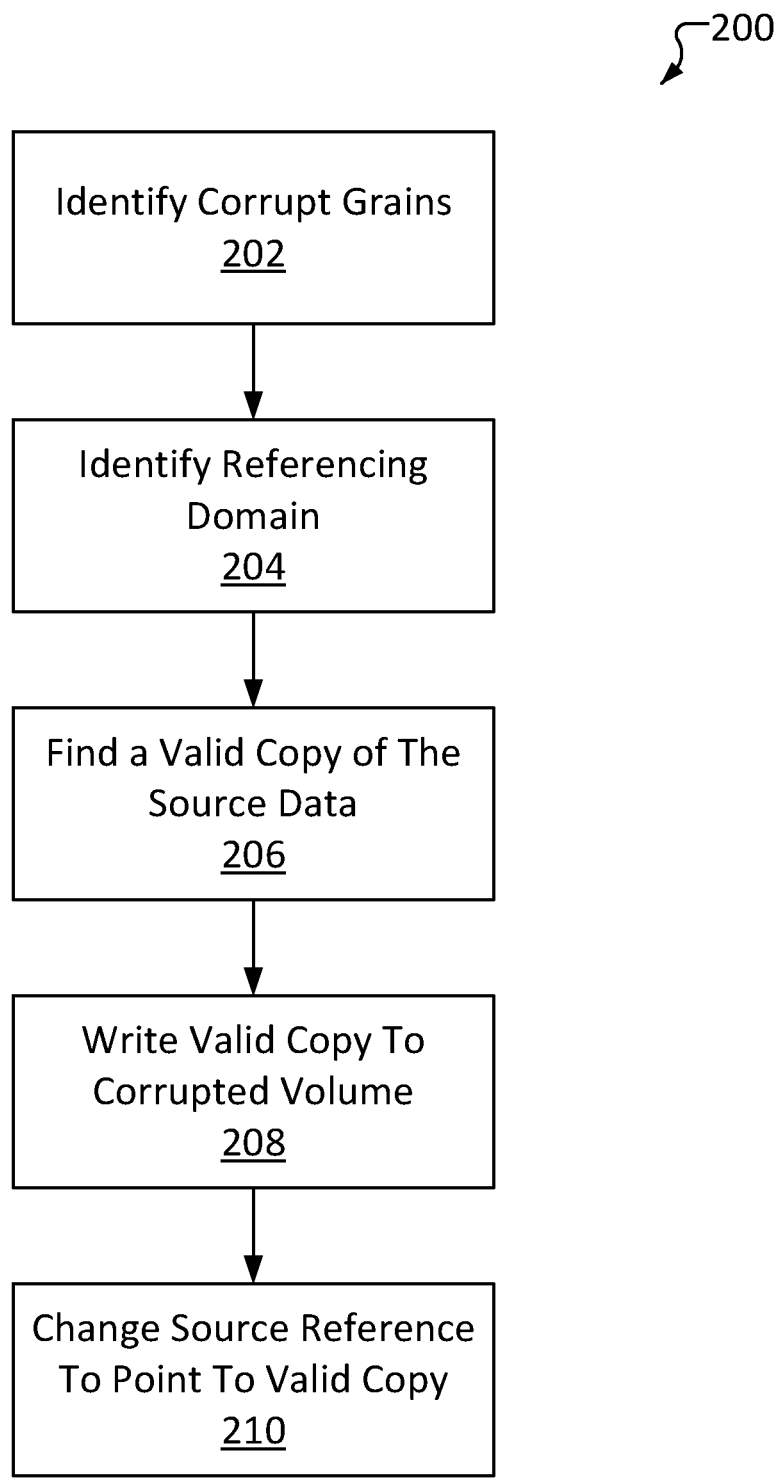
FIG. 2 illustrates an example volume recovery method consistent with several embodiments of the present disclosure.

FIG. 2 illustrates an example volume recovery method 200 consistent with several embodiments of the present disclosure. Method 200 includes identifying corrupt grains at operation 202. Operation 202 may include, for example, performing a journal replay to rebuild forward lookup metadata. The journal entries may be replayed from the time of the last snapshot and processed by a Deduplication and Data Reduction recovery mechanism in order to rebuild the metadata. Operation 202 may also include reading a data disk as part of this rebuild mechanism to identify corrupt address ranges. Corrupt grains are thus identified for which the source data is corrupt but the metadata is valid.

Method 200 further includes identifying a referencing domain of each corrupt grain at operation 204. The referencing domain for each of these grains is identified, i.e. the set of all referrers and source that are linked and point to corrupt source data. If a grain is the source, any references to the grain have been created subsequent to the write. Thus, the journal recovery mechanism may identify corrupt sources as well as their referrers, as the references created need to be replayed too. Under the proposed scheme, entries to the journal may be added documenting the referrer virtual address and volume-id when incrementing/decrementing reference counts for a given chunk. Scanning ahead in the journal may thus enable identifying the referencing domain for any given source.

In some embodiments, for large journals, the above approach of piecing together each referencing domain individually may be deemed too expensive. Operation 204 may include a heuristic approach, where volumes document at a relatively granular level which volumes they refer to. Such an approach may allow the identification of certain referencing domain members, for example by checking whether the same virtual address on both volumes contains deduplication matches as may be the case for certain virtual desktop infrastructure (VDI) environments.

In some embodiments, if two-way-deduplication references, i.e. forwards and backwards, are included so that the source metadata points to its referrers (as well as the referrer metadata pointing to the source), operation 204 may be made trivial, albeit at the cost of additional metadata overheads.

Method 200 further includes finding a valid copy of the source data at operation 206. Operation 206 may include, for example, determining whether there is a valid copy of the source data for this referencing domain, i.e. the source grain of the referencing domain, by searching of all volumes in the referencing domain and their respective grains. Checking for a valid copy can be implemented by checking that the volume copy LBA ranges that are referred to by the referencing domain for this copy are valid. This is a test that the data on that copy is up to date (in copy services terms one would say 'synchronized') and not corrupt itself. Having identified the volumes, copy services can provide the identity of the other copy. The valid data could be a previously recovered grain in a different deduplication pool. This can lead to complex interactions between recovering pools, but this does not present a fundamental challenge to the proposed approach, since the recovery mechanism can be applied iteratively, wherein valid copies of source data are moved one step at a time between volumes or other data storage units that are linked by copy services as many times as are needed for the valid data to migrate to the destination referencing domain. It is possible to confirm that the found, valid copy of the piece of metadata matches the grain in question, as the forward-lookup metadata typically will contain a dedup-lookup-hash (typically SHA256 or similar) for this data, which can be matched against by hashing this copy.

Method 200 further includes writing a valid copy to address space accessible by the reference domain at operation 208. For example, Operation 208 may include reading and writing (i.e., copying) the valid copy of the grain maintained by the copy service which has been found to address space that is accessible by the referencing domain. For example, the valid copy may be written to the data disk of the referencing domain such as the volume where the corrupted referencing domain stores its data.

Method 200 further includes changing the source reference point to the valid copy at operation 210. For example, after having written the valid data copy to the data disk, the source reference for the referencing domain may be changed (at operation 210) to reference this new address location of the valid data that has been copied across. All other metadata can be left intact. The system may then record that the grain has been recovered with valid data. Recording the recovery of the referencing domain may allow subsequent iterations of the same recovery mechanism to use the recovered referencing domain to repair other referencing domains that have not yet been recovered with which the recovered referencing domain has a copy services relationship. It is noted that this step of changing the source reference pointer can be a useful option, since when copying across from the valid data copy, it ensures that the data is written to fresh extents (i.e. address ranges) on the data disk to avoid the risk of overwriting valid data belonging to other volumes.

In some embodiments, operation 210 may be omitted and the data overwritten in place, i.e. using the same address range. However, an overwrite-in-place procedure should additionally be tested, e.g. using checksums, to avoid overwriting any data that itself contains references.

The recovery mechanism as described in method 200 above is applied to each corrupt grain in turn. The recovery mechanism can be repeated as many times as useful, e.g. until it is detected that the latest iteration has resulted in no further recovery actions, or until a particular piece of key data is recovered, or until the system is instructed to abandon the recovery attempt.

The recovery mechanism may be able to recover the volume copy completely and in addition may be able to partially recover other volume data for volumes that are part of the referencing domain. It should however be noted that the recovery mechanism relies upon the ability to read a copy of the data during the recovery procedure. In the situation that valid data for the volume is located in other copies within the system, then the recovery mechanism may be able to recover the volume copy completely. On the other hand, if the corrupted grain is not associated with other copies of data, i.e. the referencing domain solely consists of the corrupted grain, then the recovery mechanism may not be able to recover the grain. In addition, the recovery mechanism may not be able to recover the copy completely if the copy services relationship was not completely synced at the time of the disaster or was itself partially corrupt. Nevertheless, in these situations, full recovery may not be possible, but the recovery mechanism may still be useful, since it may recover some grains, since the recovery mechanism can still be applied in cases where there is only a partially complete copy available. Namely, in disaster recovery, it is often the case that the main goal of the recovery is to restore a particular, highly specific part of the data, so partial recovery is still useful. The recovery mechanism can be extended across multiple pools with corruption. As long as there is an in-sync copy of the data without data corruption in one of the pools, then the data can be restored across all the pools and hence the data for that grain in each referencing domain for those pools. This is applicable in the scenario where the system has two or more failure domains, basically any dependency between any number of failure domains is possible so long as no metadata or overlapping source data corruption has occurred in the system.

Several specific example implementations of the proposed recovery mechanism are described in additional detail below.

Figure 3A:
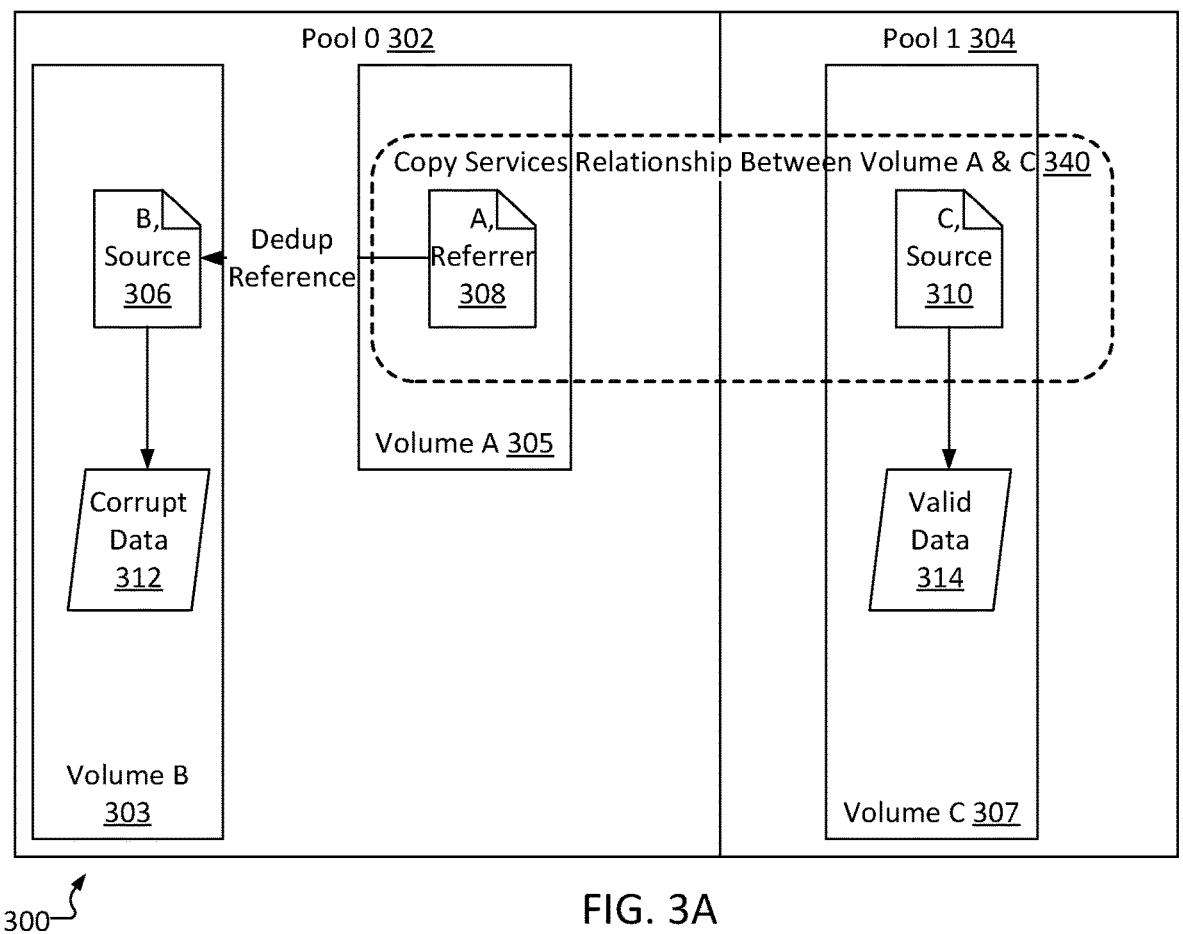
FIG. 3A shows a first example system with first and second pools according to several embodiments of the present disclosure.
Figure 3B:
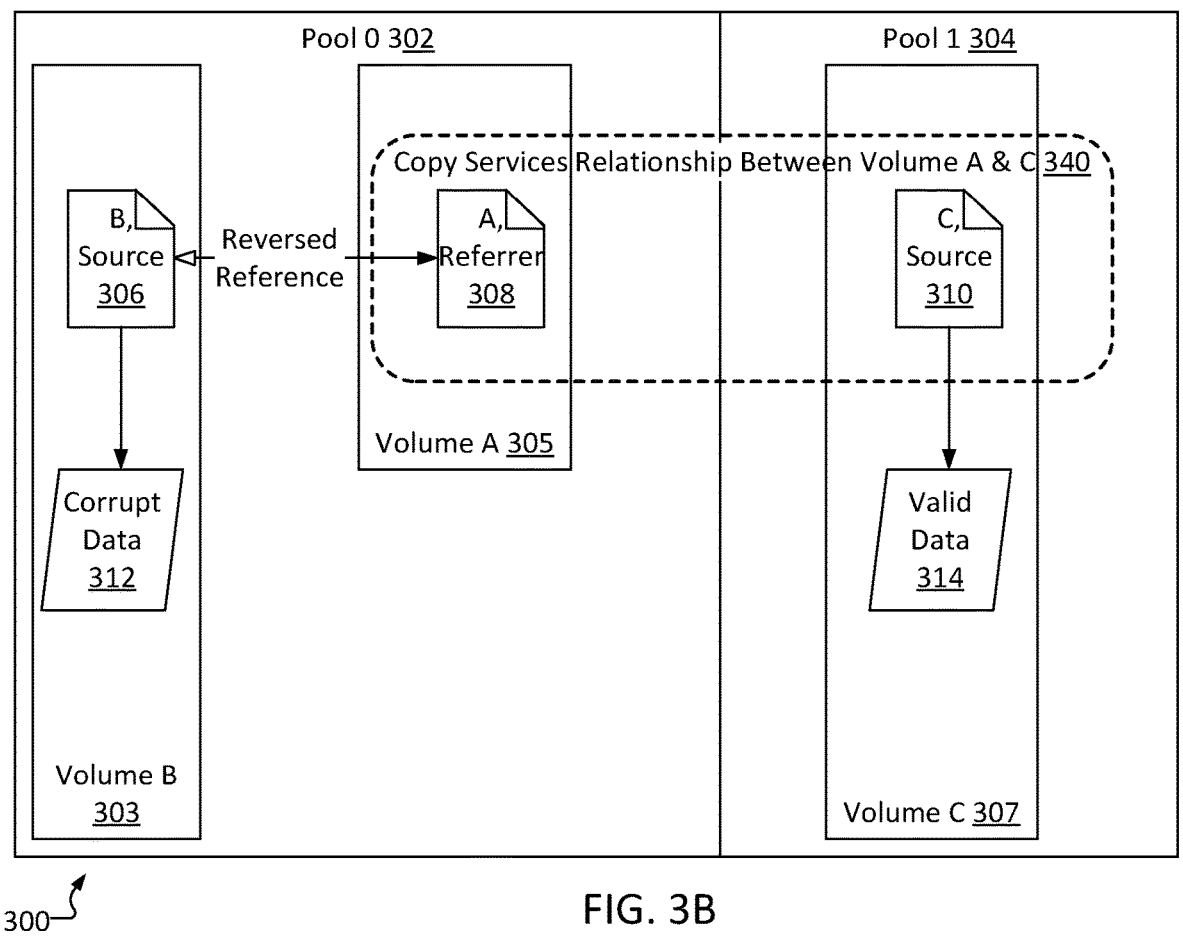
FIG. 3B shows the first example system at an intermediate stage in recovery according to several embodiments of the present disclosure.
Figure 3C:
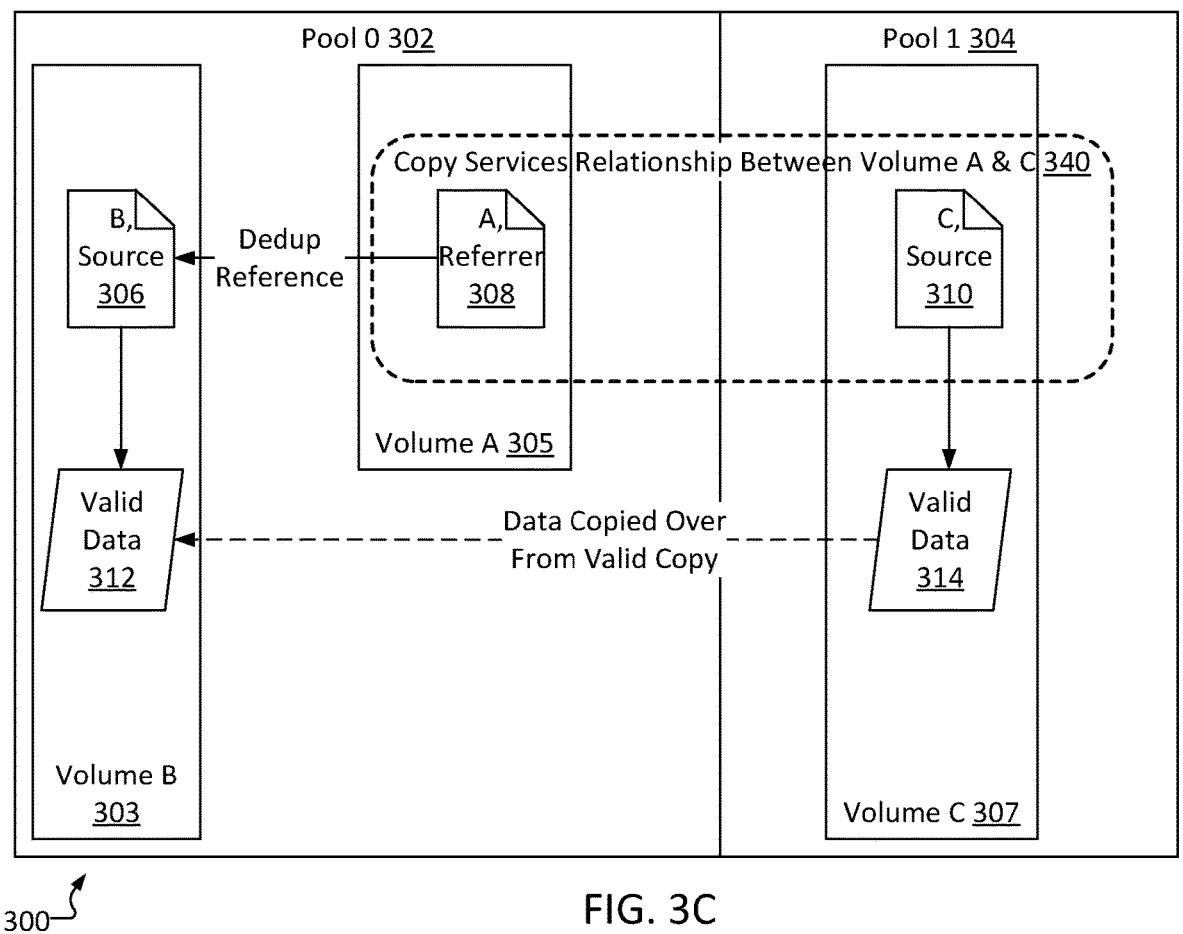
FIG. 3C shows the first example system at a final stage in recovery according to several embodiments of the present disclosure.

FIGS. 3A to 3C show sequential stages in a first example implementation of the recovery mechanism according to the disclosure. This is a simple example in which a volume copy using volume mirroring is a referrer to a deduplicated volume for a specific grain. If during recovery: (i) the data for that grain is found to be corrupted, (ii) the metadata is found to be valid, and (iii) the mirrored volume copy was clean prior to this recovery (i.e. in sync, with no data lost by the disaster), then the system will read that grain from the valid data copy and write the valid data. The deduplication metadata for that grain is left intact and the source metadata is updated to point at the recovered valid data. Effectively this will recover data for both the referrer and source grains and hence the corresponding portion of the source volume.

FIG. 3A shows a first example system 300 with first and second pools according to several embodiments of the present disclosure. Pool 0 302 has a Referrer A 308 which is in a Volume A 305 pointing with a reference to a Source B 306 in Volume B 303 which in turn points to data 312 which is corrupt, e.g. as a result of a failure event. Pool 1 304 has a Source C 310 which is in a Volume C 307 pointing to data 314 which is valid. In addition, a copy services relationship 340 as indicated by the dashed outline, e.g. mirroring, exists between Volume A 305 and Volume C 307. During recovery from the failure event the recovery mechanism identifies that the data 312 is corrupt.

FIG. 3B shows the first example system 300 at an intermediate stage in recovery according to several embodiments of the present disclosure. The recovery mechanism, having identified that data 312 is corrupt, looks for copies of data 312. It does this by undertaking a scan by following reverse paths from the deduplication reference to look through the referencing domain to check if any referencing domain members (i.e. grains) are in a volume that has a copy services relationship with another volume, in which case there should be a copy of data 312. In the illustrated example, the recovery mechanism finds that Volume A 305 of Referrer A 308 in Pool 0 302 has a copy services relationship 340 with Volume C 307 of Source C 310 in Pool 1 304 where a valid data copy of data 312 exists in the form of data 314.

FIG. 3C shows the first example system 300 at a final stage in recovery according to several embodiments of the present disclosure. The valid data copy of data 314 is copied across to Pool 0 302 to replace data 312. The corruption of data 312 is thus healed.

Figure 4A:
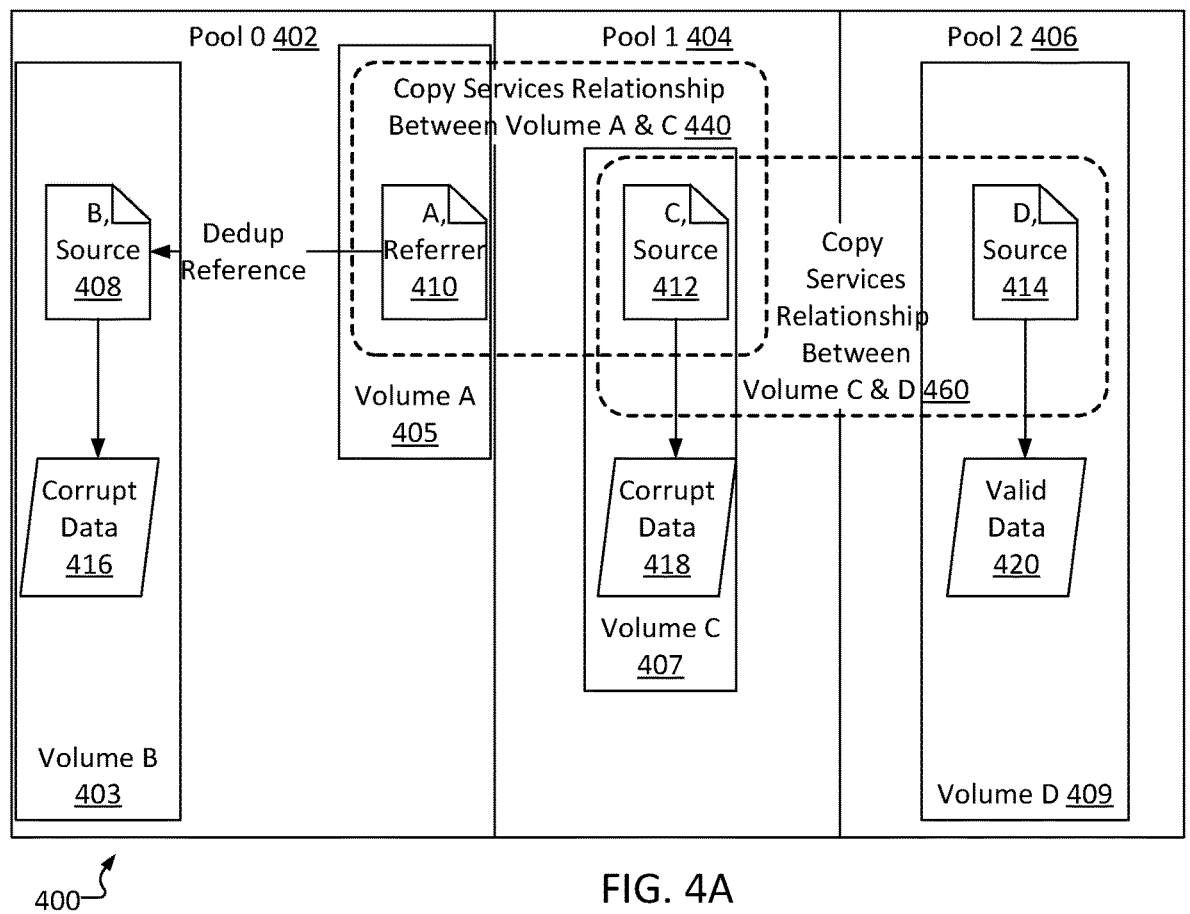
FIG. 4A shows a second example system with three pools, Pool 0, Pool 1, and Pool 2, according to several embodiments of the present disclosure.
Figure 4B:
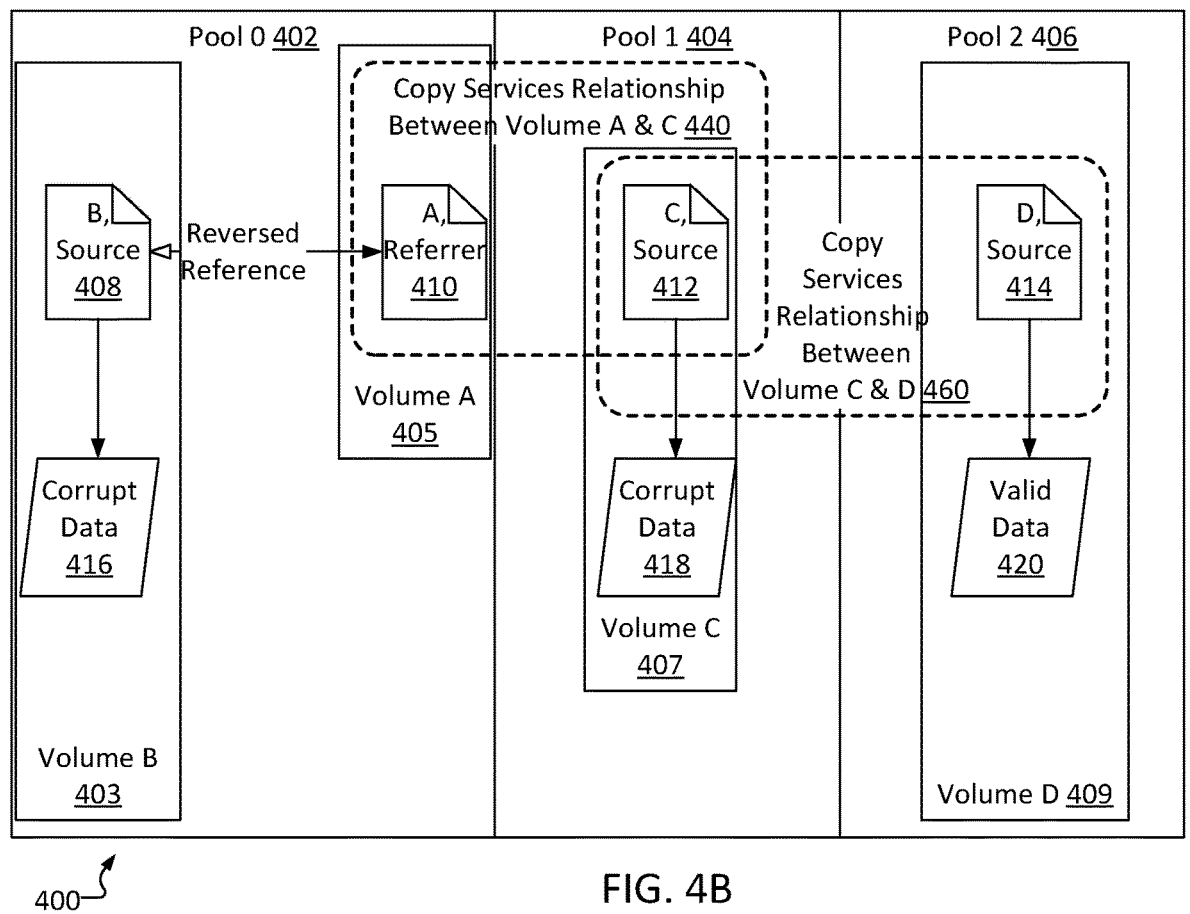
FIG. 4B shows the second example system in an intermediate stage in recovery according to several embodiments of the present disclosure.
Figure 4C:
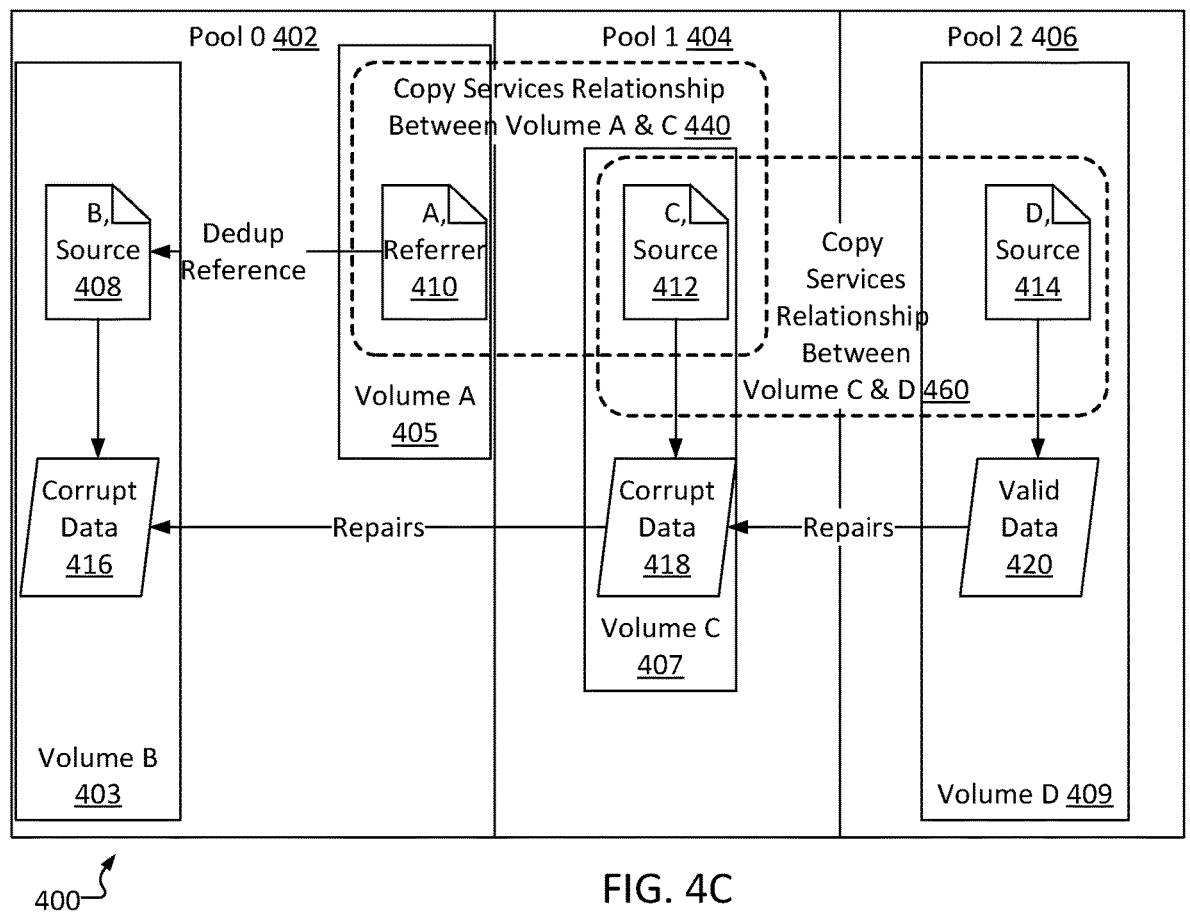
FIG. 4C shows the second example system at a final stage in recovery according to several embodiments of the present disclosure.

FIGS. 4A to 4C show sequential stages in a second example implementation of the recovery mechanism according to the disclosure. Compared to the first example, the second example involves moving valid data across two pools instead of one to heal a corruption.

FIG. 4A shows a second example system 400 with three pools, Pool 0 402, Pool 1 404, and Pool 2 406 according to several embodiments of the present disclosure. Data 416 and data 418 (in Pool 0 402 and Pool 1 404, respectively) are corrupt, whereas data 420 in Pool 3 406 is valid. There is a first copy services relationship 440 between Volume A 405 of Pool 0 402 and Volume C 407 of Pool 1 404 as indicated by a dashed outline. There is a second copy services relationship 460 between Volume C 407 of Pool 1 404 and Volume D 409 of Pool 2 406 as indicated also by a dashed outline. Pool 0 402 has a Referrer A 410 which is in Volume A 405 pointing with a reference to a Source B 408 in Volume B 403 which in turn points to data 416. Pool 2 406 has a Source D 414 pointing to data 420.

FIG. 4B shows the second example system 400 in an intermediate stage in recovery according to several embodiments of the present disclosure. The recovery mechanism, having identified that data 416 is corrupt, looks for copies of data 416. It does this in the same way as in the first example and follows the referencing domain to Referrer A 410, finds the first copy services relationship 440 to Volume C 407 of Pool 1 404, but then identifies that the copy in data 418 is also corrupt so cannot be used for recovery. However, the recovery mechanism finds the second copy services relationship 460 between Volume C 407 of Pool 1 404 and Volume D 409 of Pool 2 406, and follows that, and identifies that the further data copy data 420 is valid.

FIG. 4C shows the second example system at a final stage in recovery according to several embodiments of the present disclosure. Data 418 is repaired from data 420 by copying and then data 416 is repaired from data 418 by copying again.

FIGS. 5A to 5E show sequential stages in a third example implementation of the recovery mechanism according to the disclosure. This third example is similar to the second example (i.e., the example depicted in FIGS. 4A-4C) but is one level more complicated in that there is no copy services relationship directly between the data copies in Pool 1 and Pool 2.

Figure 5A:
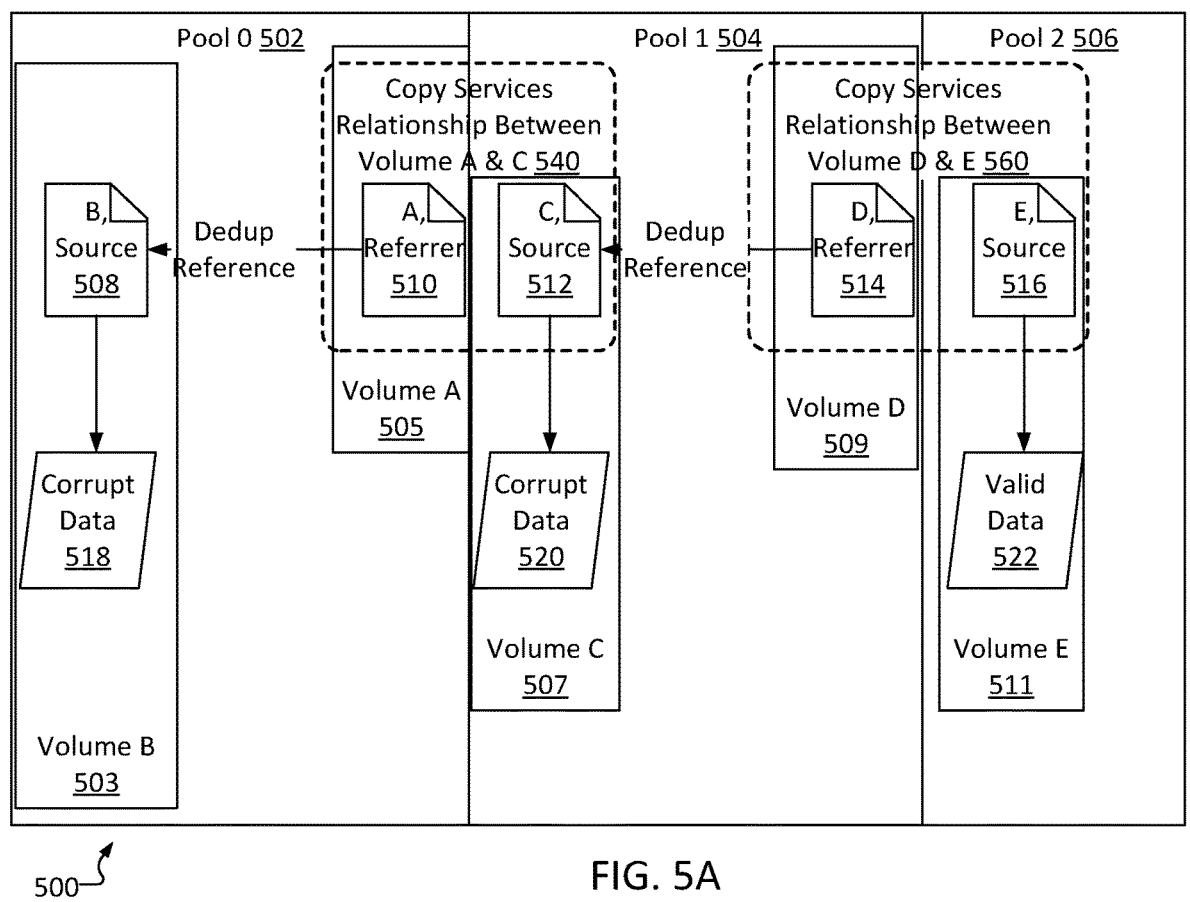
FIG. 5A shows a third example system with three pools, Pool 0, Pool 1, and Pool 2, according to several embodiments of the present disclosure.

FIG. 5A shows a third example system 500 with three pools, Pool 0 502, Pool 1 504, and Pool 2 506, according to several embodiments of the present disclosure. Data 518 and data 520 (in Pool 0 502 and Pool 1 504, respectively) are corrupt, whereas data 522 in Pool 3 506 is valid. There is a first copy services relationship 540 between Volume A 505 of Pool 0 502 and Volume C 507 of Pool 1 504 as indicated by a dashed outline. There is a second copy services relationship 560 between Volume D 509 of Pool 1 504 and Volume E 511 of Pool 2 506 as indicated also by a dashed outline. Pool 0 502 has a Referrer A 510 which is in Volume A 505 pointing with a reference to a Source B 508 in Volume B 503 which in turn points to data 518. Similarly, Pool 1 504 has a Referrer D 514 which is in Volume D 509 pointing with a reference to a Source C 512 which in turn points to data 520. Pool 2 506 has a Source E 516 which points to valid data 522.

Copy services relationship 560, as indicated by the dashed outline, indicates that one of the referrers, Referrer D 514, referring to the source grain, Source C 512, is in a copy services relationship 560 with Source E 516 in Pool 2 506. The valid data 522 in Pool 2 506 can then be copied across to Pool 1 504 and to Pool 0 502 similar to in the second example (i.e., that depicted in FIGS. 4A-4C, above), as described in further detail below.

Figure 5B:
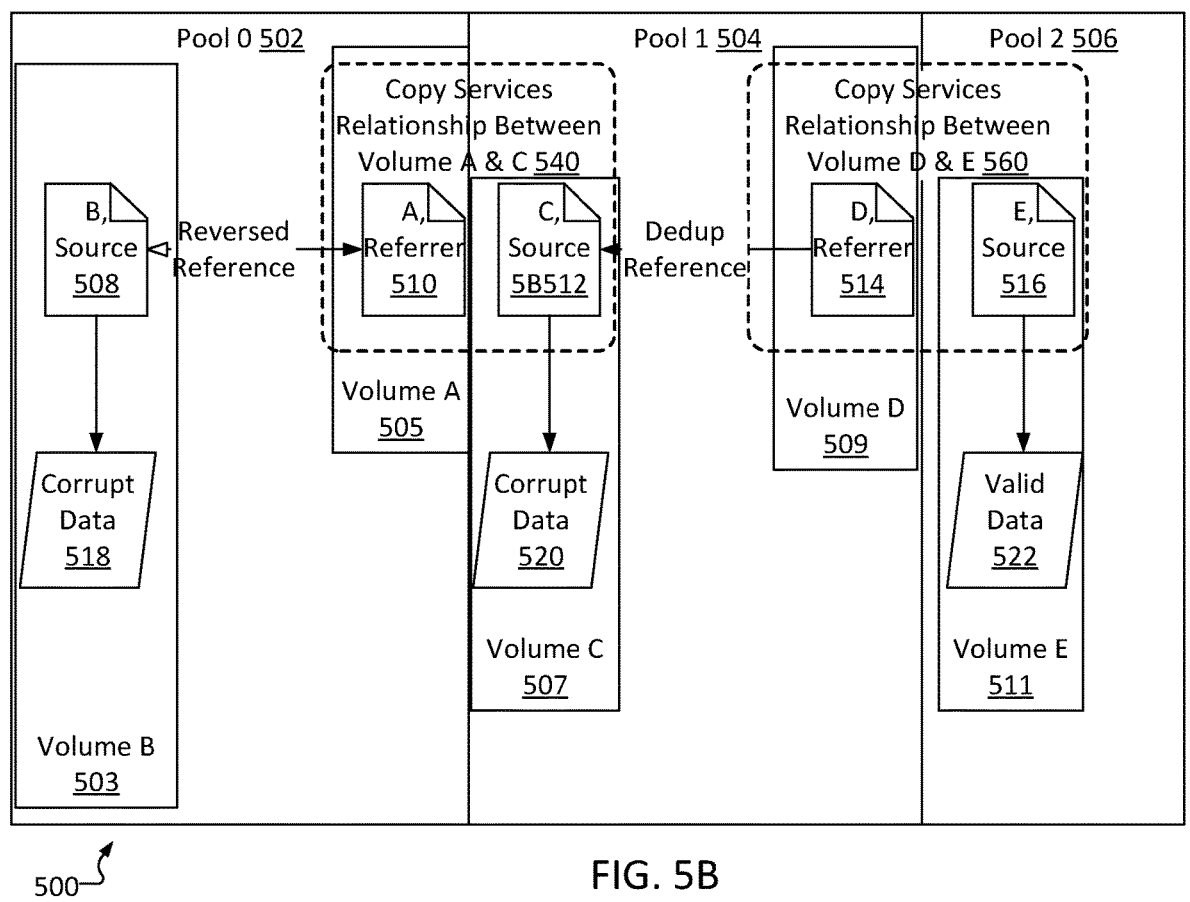
FIG. 5B shows the third example system in an intermediate stage in recovery according to several embodiments of the present disclosure.

FIG. 5B shows the third example system 500 in an intermediate stage in recovery according to several embodiments of the present disclosure. The recovery mechanism, having identified that data 518 is corrupt, looks for copies of data 518. It may do this in the same way as in the previous examples, following the referencing domain to Referrer A 510, finding the first copy services relationship 540 to Volume C 507 of Pool 1 504, but then identifies that the copy in data 520 is also corrupt so cannot be used for recovery.

Figure 5C:
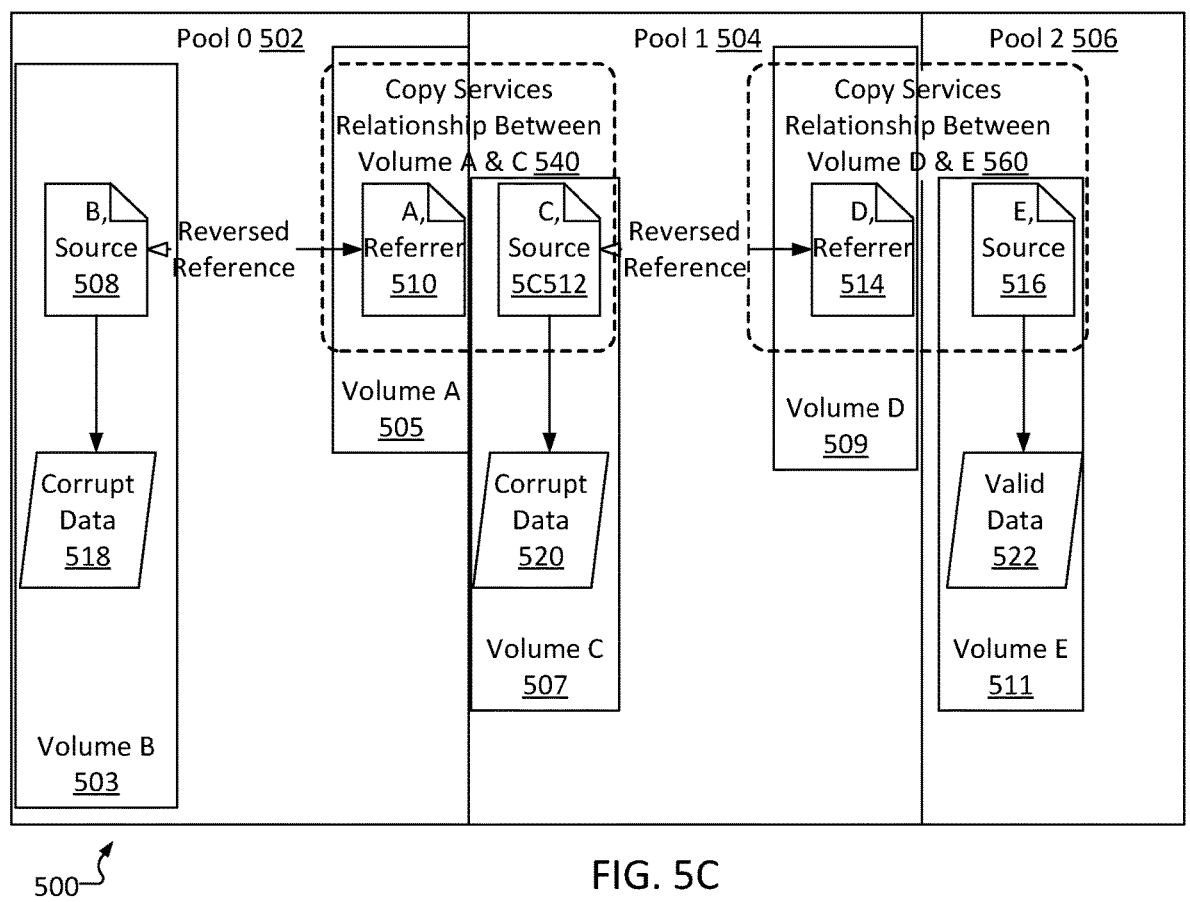
FIG. 5C shows the third example system in a next stage in recovery according to several embodiments of the present disclosure.

FIG. 5C shows the third example system 500 in a next stage in recovery according to several embodiments of the present disclosure. The recovery mechanism may find a second copy services relationship 560 between Volume D 509 of Pool 1 504 and Volume E 511 of Pool 2 506. Following relationship 560, the recovery mechanism may identify that the further data copy data 522 is valid.

Figure 5D:
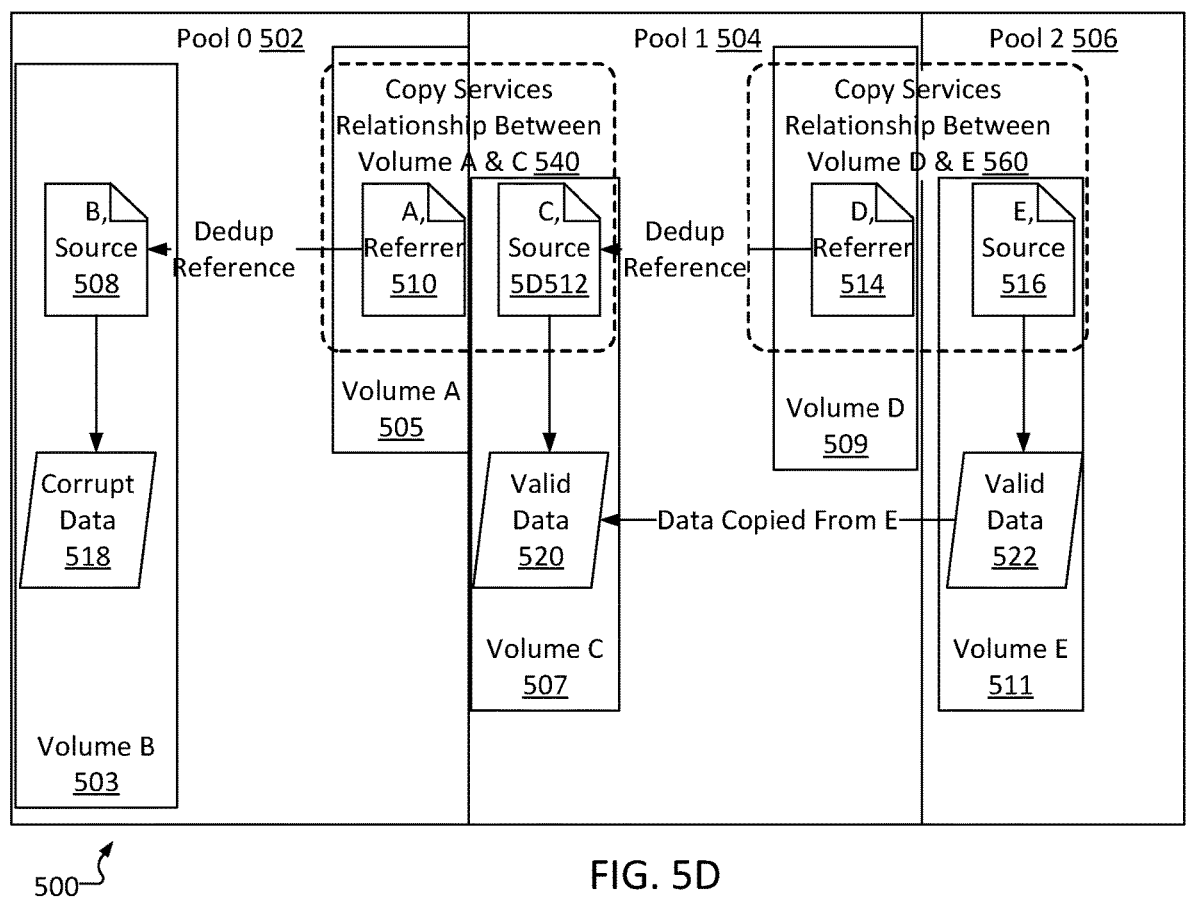
FIG. 5D shows the third example system in another stage in recovery according to several embodiments of the present disclosure.

FIG. 5D shows the third example system 500 in another stage in recovery according to several embodiments of the present disclosure. As another step towards repairing data 518, data 520 is repaired from data 522 by copying, similar to the repair of data 312 from 314 with reference to FIG. 3C.

Figure 5E:
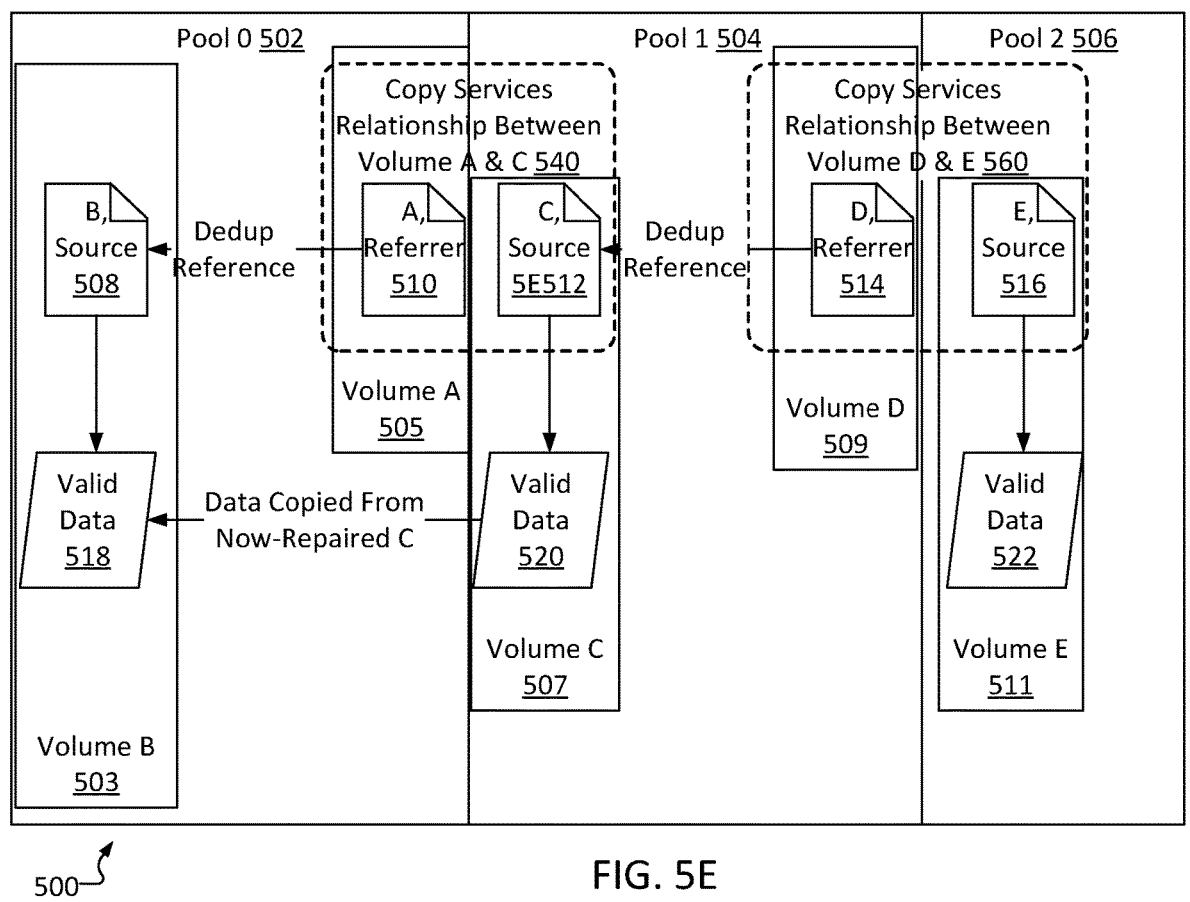
FIG. 5E shows the third example system at a final stage in recovery according to several embodiments of the present disclosure.

FIG. 5E shows the third example system 500 at a final stage in recovery according to several embodiments of the present disclosure. Data 518 is repaired from the newly-repaired data 520 by copying.

The recovery mechanism according to the disclosure is compatible with and can be used in combination with a recovery mechanism that utilizes journal replay to find the most up-to-date version of data associated with a given grain that survives on the data disk after a disaster. This may be achieved by only allowing journal replay updates to be played where the associated data is valid, if the prior metadata referenced valid data. This is a powerful recovery mechanism, as it is preferable to return old data than no data at all in many circumstances. A similar mechanism can be combined with the recovery mechanism proposed in the present disclosure to attempt to recover based-off copy services, i.e. other copies of data available in another location from copy services (e.g. another copy of the volume in a different pool). The recovery mechanism according to the present disclosure can be used to discover valid data in other copies across a larger domain (e.g. across multiple pools) as well as within a single domain (e.g. a single pool). The recovery mechanism proposed in the present disclosure, particularly when combined other recovery mechanisms, allows for the recovery of newer data than would otherwise be possible.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
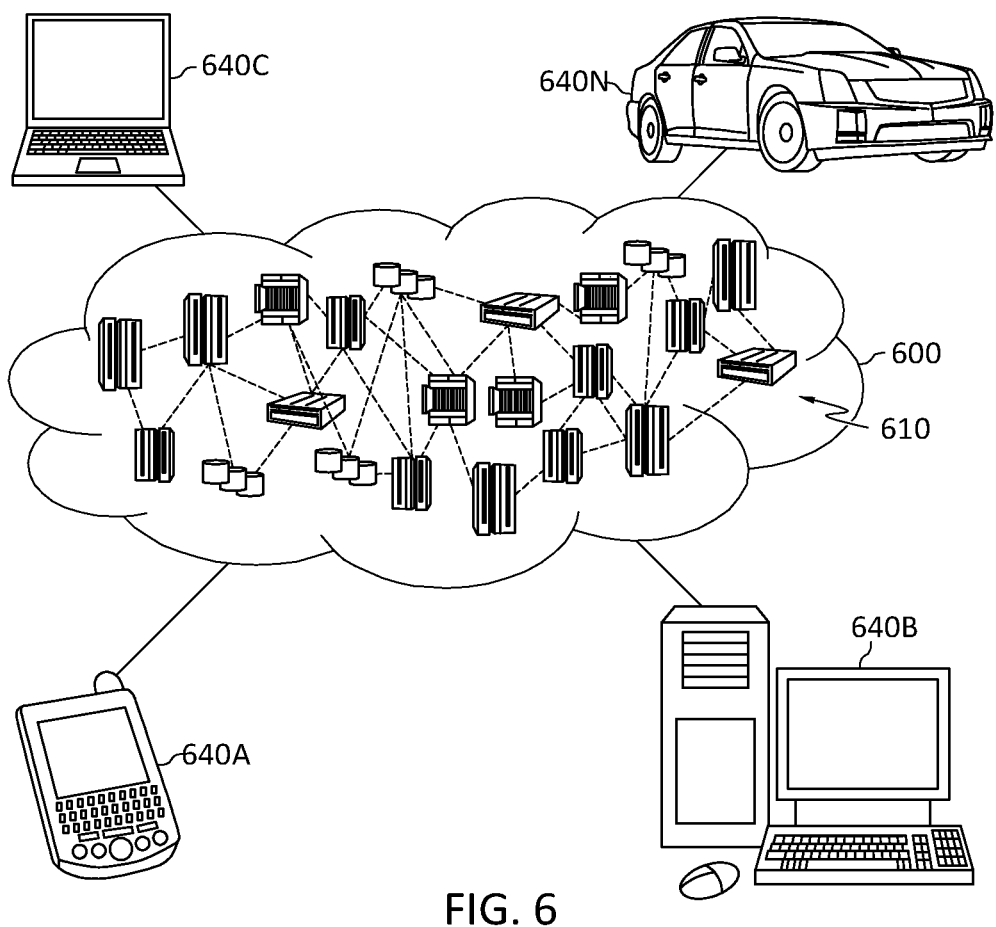
FIG. 6 depicts a cloud computing environment according to an embodiment of the present disclosure.

Referring now to FIG. 6, illustrative cloud computing environment 600 is depicted. As shown, cloud computing environment 600 comprises one or more cloud computing nodes 610 with which local computing devices used by cloud consumers, such as, for example, personal digital assistant (PDA) or cellular telephone 640A, desktop computer 640B, laptop computer 640C, and/or automobile computer system 640N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 640A-N shown in FIG. 6 are intended to be illustrative only and that computing nodes 610 and cloud computing environment 600 can communicate with any type of computerized device over any type of network and/or network addressable connection (e.g., using a web browser).

Figure 7:
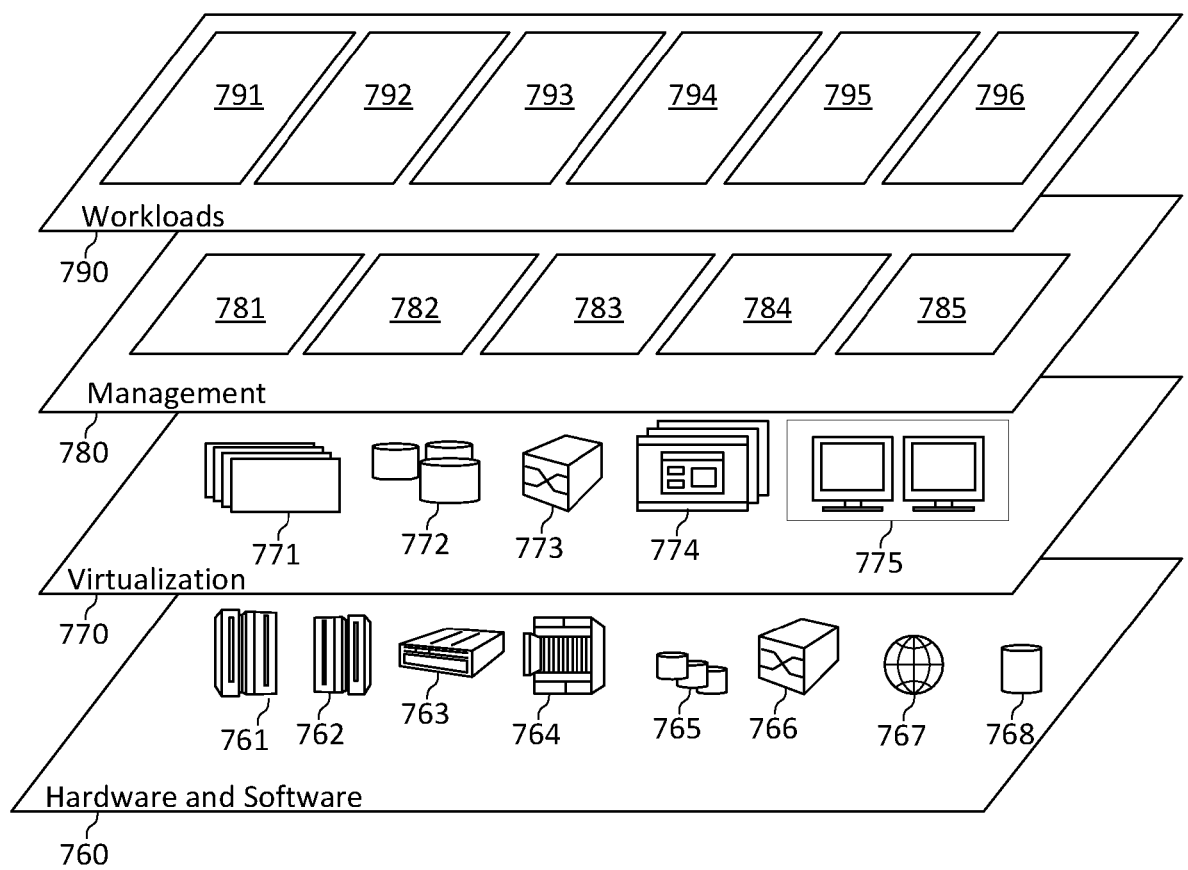
FIG. 7 depicts abstraction model layers according to an embodiment of the present disclosure.

Referring now to FIG. 7, a set of functional abstraction layers provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and storage facility disaster recovery 796.

Figure 8:
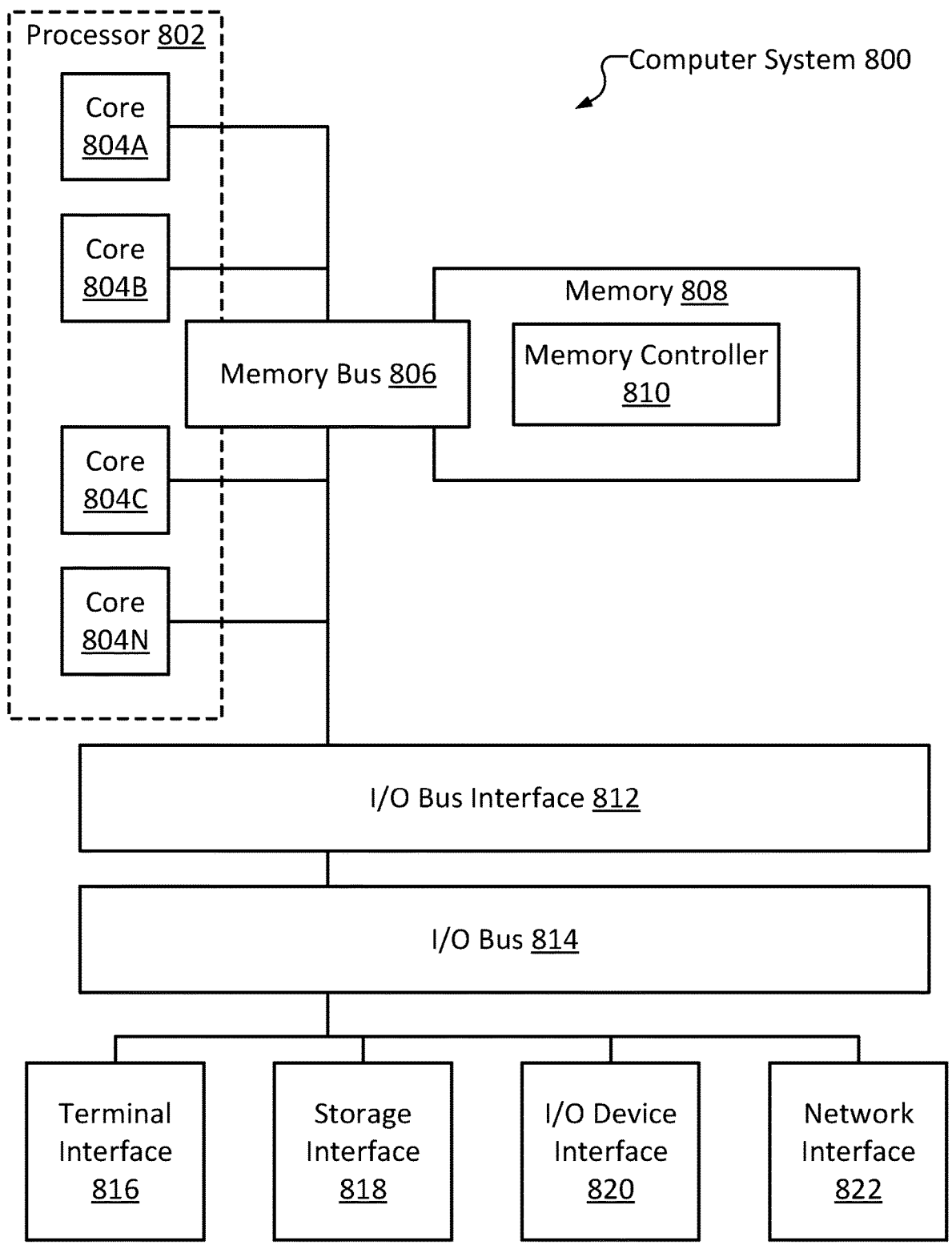
FIG. 8 illustrates a high-level block diagram of an example computer system that may be used in implementing embodiments of the present disclosure.

Referring now to FIG. 8, shown is a high-level block diagram of an example computer system 800 that may be configured to perform various aspects of the present disclosure, including, for example, method 200. The example computer system 800 may be used in implementing one or more of the methods or modules, and any related functions or operations, described herein (e.g., using one or more processor circuits or computer processors of the computer), in accordance with embodiments of the present disclosure. In some embodiments, the major components of the computer system 800 may comprise one or more CPUs 802, a memory subsystem 808, a terminal interface 816, a storage interface 818, an I/O (Input/Output) device interface 820, and a network interface 822, all of which may be communicatively coupled, directly or indirectly, for inter-component communication via a memory bus 806, an I/O bus 814, and an I/O bus interface unit 812.

The computer system 800 may contain one or more general-purpose programmable central processing units (CPUs) 802, some or all of which may include one or more cores 804A, 804B, 804C, and 804D, herein generically referred to as the CPU 802. In some embodiments, the computer system 800 may contain multiple processors typical of a relatively large system; however, in other embodiments the computer system 800 may alternatively be a single CPU system. Each CPU 802 may execute instructions stored in the memory subsystem 808 on a CPU core 804 and may comprise one or more levels of on-board cache.

In some embodiments, the memory subsystem 808 may comprise a random-access semiconductor memory, storage device, or storage medium (either volatile or non-volatile) for storing data and programs. In some embodiments, the memory subsystem 808 may represent the entire virtual memory of the computer system 800 and may also include the virtual memory of other computer systems coupled to the computer system 800 or connected via a network. The memory subsystem 808 may be conceptually a single monolithic entity, but, in some embodiments, the memory subsystem 808 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 804 may contain elements for control and flow of memory used by the CPU 802. This may include a memory controller 810.

Although the memory bus 806 is shown in FIG. 8 as a single bus structure providing a direct communication path among the CPU 802, the memory subsystem 808, and the I/O bus interface 812, the memory bus 806 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 812 and the I/O bus 814 are shown as single respective units, the computer system 800 may, in some embodiments, contain multiple I/O bus interface units 812, multiple I/O buses 814, or both. Further, while multiple I/O interface units are shown, which separate the I/O bus 814 from various communications paths running to the various I/O devices, in other embodiments some or all of the I/O devices may be connected directly to one or more system I/O buses.

In some embodiments, the computer system 800 may be a multi-user mainframe computer system, a single-user system, or a server computer or similar device that has little or no direct user interface but receives requests from other computer systems (clients). Further, in some embodiments, the computer system 800 may be implemented as a desktop computer, portable computer, laptop or notebook computer, tablet computer, pocket computer, telephone, smart phone, mobile device, or any other appropriate type of electronic device.

It is noted that FIG. 8 is intended to depict the representative major components of an exemplary computer system 800. In some embodiments, however, individual components may have greater or lesser complexity than as represented in FIG. 8, components other than or in addition to those shown in FIG. 8 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

According to one aspect of the disclosure, there is provided a method for recovering data after a disaster event which has corrupted data in a storage facility of the kind that both operates with deduplication and also that maintains multiple copies of data through establishing copy services relationships between different storage volumes, wherein the deduplication generates referencing domains which are formed through references between grains, each referencing domain having a source grain containing a reference pointing to a location where data is stored and at least one referrer pointing to the source, the data recovery method comprising identifying a source that following a disaster event is pointing to data which is corrupt, establishing whether a copy services relationship exists between the referencing domain of the source with corrupted data and another referencing domain in which case the other referencing domain will have a copy of the corrupted data, checking that the copy is valid, and, if 'yes', writing the copy to replace the corrupted data.

In certain embodiments, establishing whether a copy services relationship exists between the referencing domain of the source with corrupted data and another referencing domain includes checking for a copy services relationship directly between the source with the corrupted data and another referencing domain.

In certain embodiments, establishing whether a copy services relationship exists between the referencing domain of the source with corrupted data and another referencing domain includes scanning the references to the source with the corrupted data to check whether a copy services relationship exists between any one of its referrers and another referencing domain. The storage facility may implement deduplication in that the references consist only of forward references, a forward reference being held by each referrer to point to its source, and wherein scanning the references to crawl over the referencing domain involves reversing the forward references and following the reversed forward references. Alternatively, the storage facility may implement deduplication in that the references include both forward and backward references, a forward reference being held by each referrer to point to its source, and backward references being held by each source to point to its referrers, wherein scanning the references to crawl over the referencing domain involves following the backward references.

In certain embodiments, if checking the copy is valid returns a 'no' result establishing that the copy is also corrupt, then the method further comprises: establishing whether a copy services relationship exists between the referencing domain of the copy which is also corrupt and a still further referencing domain, in which case the still further referencing domain will have a further copy of the corrupted data; checking that the further copy is valid; if 'yes', writing the further copy to replace the corrupted data of both the copy and the originally identified source; and repairing the source references to point to the written copies.

The data recovery method may further comprise repairing the source reference to point to the written copy.

The data recovery method may be implemented such that said checking that the copy is valid comprises checking that address ranges that are referred to by the referencing domain for this copy are valid.

The copy services relationship may be between storage at different levels in the storage hierarchy. For example, the storage may be in a three-level hierarchy of volumes, pools and storage systems and a copy services relationship, such as remote copy, may exist between storage volumes, between storage pools, and/or between storage systems. A copy services relationship between different storage systems will allow recovery of data from another storage system in cases where there are extra system copies of valid data. "Storage system," as used herein, typically refers to sets of nodes forming a cluster that manage a localized pool of resources. A customer can have copies of volumes between multiple clusters, for example different physical sites or power domains. In this case, as long as the copy was in sync, i.e. valid, prior to the disaster then data can still be recovered according to methods described in the present disclosure. An example here is remote copy or global mirror. The data copies can be within the same cluster or across multiple clusters.

Corrupted source data can be recovered in embodiments of the disclosure by examining a copy service that has been running for the disaster domain to find a (non-corrupted) copy of the corrupt data in the referencing domain, writing the data from the non-corrupted data to the pool where the corrupt data is located as restored data and amending the metadata in the source to point to the restored data instead of the corrupted data. Amending the metadata is generally required, since it will not be safe to overwrite the corrupted data with the non-corrupted data, but rather the non-corrupted data should be copied into a different, unallocated address space range.

The proposed approach thus provides a recovery mechanism that allow recovery of data in a deduplicated system via reads to volume copies established by a copy service in another storage pool or JO group. This is achieved in a fashion that restores data and maintains valid deduplication references in order to recover data on all volumes in the same referencing domain as the volume copy.

A benefit of a recovery mechanism consistent with the present disclosure is its ability to recover corrupted source data without performing a full resync or restore. Since the referencing metadata is "a priori" valid, since that is a prerequisite of applying the approach described herein, source data can be recovered for any volumes where referrers are located. With this approach, a storage facility operating with deduplication and configured to have multiple, i.e. at least two, separate failure domains between which copies of source data are maintained would be able to recover completely from a disaster that was confined to source data corruption.

According to another aspect of the disclosure, there is provided a computer program stored on a computer readable medium and loadable into the internal memory of a computer, comprising software code portions, when said program is run on a computer, for performing the above-described method. A computer program product storing the computer program may also be provided.

According to another aspect of the disclosure, there is provided a storage facility comprising a plurality of storage volumes that are configured jointly to maintain copies of data between them through copy services relationships, each storage volume being configured to operate with deduplication so that in use referencing domains are formed through references between grains, each referencing domain having a source grain containing a reference pointing to a location where data is stored and at least one referrer pointing to the source, the storage facility having a data recovery mechanism operable recover data after a disaster event that is configured to identify a source that following a disaster event is pointing to data which is corrupt, establish whether a copy services relationship exists between the referencing domain of the source with corrupted data and another referencing domain in which case the other referencing domain will have a copy of the corrupted data, check that the copy is valid, and, if 'yes', write the copy to replace the corrupted data.

It will be clear to one skilled in the art that many improvements and modifications can be made to the foregoing exemplary embodiment without departing from the scope of the present disclosure.

What is claimed is:

1. A method comprising:
   identifying a first source in a data storage facility that, following a disaster event, is pointing to data which is corrupt;
   determining that a first copy services relationship exists between a first referencing domain of the first source and a second referencing domain, wherein the first copy services relationship indicates the second referencing domain will have a second copy of the corrupted data;
   determining that the second copy is not valid;
   determining, responsive to the determination that the second copy is not valid, that a second copy services relationship exists between the second referencing domain and a third referencing domain, wherein the second copy services relationship indicates the third referencing domain will have a third copy of the corrupted data;
   determining whether the third copy is valid;
   responsive to a determination that the third copy is valid, writing the third copy to replace the corrupted data of both the second copy and the first source; and
   repairing source references to point to the written copies.

2. The method of claim 1, wherein determining that the first copy services relationship exists between the first referencing domain and the second referencing domain includes checking for a first copy services relationship directly between the first source and another referencing domain.

3. The method of claim 1, wherein determining that the first copy services relationship exists between the first referencing domain and the second referencing domain includes scanning references to the first source to check whether a first copy services relationship exists between any referrer of the first source and another referencing domain.

4. The method of claim 3, wherein:
   the data storage facility implements deduplication in that the references consist only of forward references, a forward reference being held by each referrer to point to its source; and
   scanning the references to crawl over the referencing domain includes reversing the forward references and following the reversed forward references.

5. The method of claim 3, wherein:
   the data storage facility implements deduplication in that the references include both forward and backward references, a forward reference being held by each referrer to point to its source, and backward references being held by each source to point to its referrers; and
   scanning the references to crawl over the referencing domain includes following the backward references.

6. The method of claim 1, wherein the determining whether the third copy is valid comprises checking that address ranges that are referred to by the third referencing domain are valid.

7. A system comprising:
   a memory; and
   a central processing unit (CPU) including one or more CPU cores configured to:
      identify a first source in a data storage facility that, following a disaster event, is pointing to data which is corrupt;
      determine that a first copy services relationship exists between a first referencing domain of the first source and a second referencing domain, wherein the first copy services relationship indicates the second referencing domain will have a second copy of the corrupted data;
      determine that the second copy is not valid;
      determine, responsive to the determination that the second copy is not valid, that a second copy services relationship exists between the second referencing domain and a third referencing domain, wherein the second copy services relationship indicates the third referencing domain will have a third copy of the corrupted data;
      determine whether the third copy is valid;
      responsive to a determination that the third copy is valid, write the third copy to replace the corrupted data of both the second copy and the first source; and
      repair source references to point to the written copies.

8. The system of claim 7, wherein determining that the first copy services relationship exists between the first referencing domain and the second referencing domain includes checking for a first copy services relationship directly between the first source and another referencing domain.

9. The system of claim 7, wherein determining that the first copy services relationship exists between the first referencing domain and the second referencing domain includes scanning references to the first source to check whether a first copy services relationship exists between any referrer of the first source and another referencing domain.

10. The system of claim 9, wherein:
    the data storage facility implements deduplication in that the references consist only of forward references, a forward reference being held by each referrer to point to its source; and
    scanning the references to crawl over the referencing domain includes reversing the forward references and following the reversed forward references.

11. The system of claim 9, wherein:
    the data storage facility implements deduplication in that the references include both forward and backward references, a forward reference being held by each referrer to point to its source, and backward references being held by each source to point to its referrers; and
    scanning the references to crawl over the referencing domain includes following the backward references.

12. A computer program product, the computer program product comprising a computer readable storage medium having program instructions embodied therewith, the program instructions executable by a computer to cause the computer to:
    identify a first source in a data storage facility that, following a disaster event, is pointing to data which is corrupt;
    determine that a first copy services relationship exists between a first referencing domain of the first source and a second referencing domain, wherein the first copy services relationship indicates the second referencing domain will have a second copy of the corrupted data;

determine that the second copy is not valid;

determine, responsive to the determination that the second copy is not valid, that a second copy services relationship exists between the second referencing domain and a third referencing domain, wherein the second copy services relationship indicates the third referencing domain will have a third copy of the corrupted data;

determine whether the third copy is valid;

responsive to a determination that the third copy is valid, write the third copy to replace the corrupted data of both the second copy and the first source; and repair source references to point to the written copies.

13. The computer program product of claim 12, wherein determining that the first copy services relationship exists between the first referencing domain and the second referencing domain includes checking for a first copy services relationship directly between the first source and another referencing domain.

14. The computer program product of claim 12, wherein determining that the first copy services relationship exists between the first referencing domain and the second referencing domain includes scanning references to the first source to check whether a first copy services relationship exists between any referrer of the first source and another referencing domain.

15. The computer program product of claim 14, wherein:
the data storage facility implements deduplication in that the references consist only of forward references, a forward reference being held by each referrer to point to its source; and
scanning the references to crawl over the referencing domain includes reversing the forward references and following the reversed forward references.

16. The computer program product of claim 14, wherein:
the data storage facility implements deduplication in that the references include both forward and backward references, a forward reference being held by each referrer to point to its source, and backward references being held by each source to point to its referrers; and
scanning the references to crawl over the referencing domain includes following the backward references.

* * * * *